United States Patent [19]

Wilkinson

[11] Patent Number: 5,659,363

[45] Date of Patent: Aug. 19, 1997

[54] CODING AND DECODING OF VIDEO SIGNALS

[75] Inventor: James Hedley Wilkinson, Tadley, United Kingdom

[73] Assignees: Sony Corporation, Tokyo, Japan; Sony United Kingdom Limited, Weyridge, United Kingdom

[21] Appl. No.: 380,552

[22] Filed: Jan. 30, 1995

[30] Foreign Application Priority Data

Feb. 21, 1994 [GB] United Kingdom ............... 9403243

[51] Int. Cl.$^6$ .......................................... H04N 7/46
[52] U.S. Cl. ........................ 348/398; 348/416; 348/424
[58] Field of Search ............................. 348/398, 415, 348/416, 424; H04N 7/46

[56] References Cited

U.S. PATENT DOCUMENTS 5,272,530 12/1993 Cassereau ............................ 348/416

FOREIGN PATENT DOCUMENTS

WO 93/09637 5/1993 WIPO ............................. H04N 7/13

*Primary Examiner*—Howard W. Britton
*Attorney, Agent, or Firm*—William S. Frommer; Alvin Sinderbrand

[57] ABSTRACT

A video signal coding apparatus for coding first and second input video images comprises a motion vector generator for matching pixels of the second input image B with pixels of the first input image A to derive motion vectors representing the motion of pixels in the second image between the two images, each motion vector being associated with the location of a pixel in the second image B and the location of the matched pixel in the first image A. The apparatus includes an encoder for processing the two input images A, B to produce first and second output video images C, D, pixels of the first output image C being produced by addition of equally weighted pixels in the two input images A, B, and pixels of the second output image D being produced by subtraction of equally weighted pixels in the two input images A, B. A coding controller controls the encoder in dependence upon the motion vectors such that each said pixel of the first output image C is produced by addition of the co-sited pixel in the first input image and its matched pixel in the second input image as determined by the associated motion vector, and each said pixel of the second output image D is produced by subtracting the co-sited pixel in the second input image from its matched pixel in the first input image as determined by the associated motion vector. A complementary decoding apparatus is also provided for decoding input images coded by the coding apparatus. The coding and decoding apparatus can be applied for temporal sub-band frequency separation and reconstruction of video signals in video compression and decompression processes.

24 Claims, 7 Drawing Sheets

FIG. 4

STAGE 3

STAGE 2

$\dfrac{F_0+F_1+F_2+F_3}{4}$ $\dfrac{F_0+F_1-(F_2+F_3)}{4}$ $\dfrac{F_4+F_5+F_6+F_7}{4}$ $\dfrac{F_4+F_5-(F_6+F_7)}{4}$

STAGE 1

$\dfrac{F_0+F_1}{2}$ $\dfrac{F_0-F_1}{2}$ $\dfrac{F_2+F_3}{2}$ $\dfrac{F_2-F_3}{2}$ $\dfrac{F_4+F_5}{2}$ $\dfrac{F_4-F_5}{2}$ $\dfrac{F_6+F_7}{2}$ $\dfrac{F_6-F_7}{2}$

INPUT: $F_0$, $F_1$, $F_2$, $F_3$, $F_4$, $F_5$, $F_6$, $F_7$

8a

CODING AND DECODING OF VIDEO SIGNALS

BACKGROUND OF THE INVENTION

1. Field of the Invention

This invention relates to methods and apparatus for coding and decoding of video signals. Such methods and apparatus may be applied, for example, in digital video compression and decompression processes.

2. Description of the Prior Art

Known video compression techniques may involve spatial (i.e. intra-image) and/or temporal (i.e. inter-image) coding of video signals. One known method of spatial coding involves sub-band frequency separation of video images (i.e. fields or frames of the video signal) in the two-dimensional spatial frequency domain. Frequency separation into the desired number of sub-bands can be achieved using a filter system where filtering in the horizontal image direction is performed independently of filtering in the vertical image direction. For each of the horizontal and vertical filtering processes, the filter system is formed of a series of filter stages arranged in a tree structure, each filter stage comprising complimentary low and high pass filters. A video image supplied to the low and high pass filters at the first filter stage of the horizontal filter system is split into two horizontal frequency bands, a low pass band and a high pass band, which are decimated separately at the output of each filter. Each of these bands may then be supplied to further similar filter stages for further sub-division into low and high frequency components, and the process repeated until the desired number of horizontal sub-bands is obtained. Each sub-band component can then be applied to the vertical filter system for further sub-division into vertical bands, so that eventually the input image is decorrelated into the desired number of spatial frequency components within the two-dimensional spatial frequency domain.

Depending on the arrangement of the filter system, the image may be separated into sub-band components of uniform size or non-uniform size, the frequency separation process in the latter case being known as logarithmic or "wavelet" coding. In either case, the spatial frequency component data may then be subjected to a quantization process where the degree of quantization for the different spatial frequency components depends on the human visual responsiveness at different spatial frequencies, and the resulting quantized data may then be entropy encoded prior to onward transmission, storage, etc. of the compressed data. The decompression process reverses the various stages of the compression process to reconstruct the original image data.

The frequency separation techniques described above are purely spatial coding processes, no account being taken of any redundancy along the temporal axis due to similarities between successive video images. The MPEG (Moving Picture Experts Group) standard developed by the International Organisation for Standardisation defines a standard for, inter alia, video compression and proposes a system involving both spatial and temporal processing. The MPEG standard is summarised in Communications of the ACM, April 1991, Volume 34, No. 4, Pages 47 to 58.

One MPEG scheme uses a frame-based DPCM loop as illustrated schematically in FIG. 1 of the accompanying drawings. According to this scheme, the difference between successive video images is calculated to eliminate some temporal redundancy, and the difference signal is subjected to a spatial coding process. To ensure low entropy in the difference signal, the system utilises motion vector estimation to derive motion vectors representing the motion of the image content of blocks of pixels, or "macroblocks", between successive video images, and the difference is calculated on a block by block basis along the direction of the motion vectors.

Referring to the block diagram of FIG. 1, a pair of successive video frames is supplied to a motion vector generator 1 which, using known motion vector estimation techniques, derives for each macroblock (here an array of 16×16 pixels) of the second input frame a motion vector representing the motion (in terms of numbers of pixels in the horizontal and vertical image directions) of that macroblock between the second frame and the first frame. The first frame is then output via a subtracter 2 to a spatial coder 3 which performs a spatial encoding process, the spatially encoded frame being supplied to an output 4a for storage, transmission, further processing, etc. The encoded first frame is also fed back via a decoder 5, which reverses the spatial coding process performed by the coder 3, to a motion compensator 6 which also receives the motion vectors derived by the motion vector generator 1 and supplied to a vector output 4b.

The second frame is to be output next, on a block by block basis, by the motion vector generator 1, and the difference is to be calculated between each block of the second frame and the block in the first frame at the location "pointed to" by the motion vector for that block of the Second frame. Thus, for each successive block of the second frame, the motion compensator 6 uses the motion vector supplied for that block to identify the appropriate block of the first frame which is then output to a compensating delay 7a. Then, as each block of the second frame is output to the subtracter 2, the block of pixels in the first frame at the location pointed to by the motion vector for that block is output by the delay 7a to the negative input of the subtracter 2. These pixels are then subtracted from the corresponding pixels in the macroblock of the second frame supplied to the positive input of the subtracter 2, and the resulting difference values are output to the spatial coder 3. This process is repeated for all macroblocks of the second frame output by the motion vector generator 1. Thus, the difference between the first and second frames is calculated on a block by block basis along the direction of the motion vectors, and the difference values (after spatial coding) are supplied to the output 4a and are also fed back round the loop to one input of an adder 7b. The blocks of pixels of the first frame output by the delay 7a to the subtracter 2 are also supplied to the other input of the adder 7b. Thus, the blocks of pixels of the first frame are added to the difference values for the second frame, thereby reconstructing the second frame which is supplied to the motion compensator 6. The process can then be repeated to obtain the difference between the third frame and the second frame, and so on.

While the MPEG scheme described above achieves low entropy through use of motion compensation in the temporal coding process, there are a number of disadvantages with this scheme. Firstly, the DPCM process is asymmetric, i.e. the process is a causal one, the second output "frame" being calculated from the first, the third from the second, and so on. Errors introduced at any stage of the process will therefore be propagated through all subsequent stages. Further, the DPCM process does not separate frames into temporal frequency bands, so advantage cannot be taken of the temporal characteristics of the human visual system, for example in a quantization process.

SUMMARY OF THE INVENTION

According to one aspect of the present invention there is provided video signal coding apparatus for coding first and second input video images, the apparatus comprising:

a motion vector generator for matching pixels of the second input image with pixels of the first input image to derive motion vectors representing the motion of pixels in the second image between the two images, each motion vector being associated with the location of a pixel in the second image and the location of the matched pixel in the first image;

an encoder for processing the two input images to produce first and second output video images, pixels of the first output image being produced by addition of equally weighted pixels in the two input images, and pixels of the second output image being produced by subtraction of equally weighted pixels in the two input images; and a coding controller for controlling the encoder in dependence upon the motion vectors such that each said pixel of the first output image is produced by addition of the co-sited pixel in the first input image and its matched pixel in the second input image as determined by the associated motion vector, and each said pixel of the second output image is produced by subtracting the co-sited pixel in the second input image from its matched pixel in the first input image as determined by the associated motion vector.

The present invention is based on the idea of applying motion vector assistance to a temporal filtering process to enable sub-band frequency separation of video signals in a similar manner to the techniques described above but with temporal rather than spatial coding. The idea is based on the use of simple two-tap filters, preferably the Haar type with coefficients 1, 1, since for coding along the time axis multiple-tap filters are undesirable because of the high level of temporal alias and the need to be able to handle edits in the video sequence.

Prior to considering the present invention in more detail, the basic principle of temporal decimation and reconstruction using a Haar filter arrangement will be discussed with reference to FIGS. 2 to 5 of the accompanying drawings.

FIG. 2 is a block diagram of a basic Haar filter system comprising a single decimation stage 8a and a single reconstruction stage 8b. The decimation stage 8a comprises a low pass filter (LPF) 9a, with coefficients 1, 1, and a complementary high pass filter (HPF) 10a, with coefficients 1, −1, connected to a common input. The output of each filter 9a, 10a is connected to a divide-by-two unit 11 and a decimator 12. The reconstruction stage 8b similarly comprises a low pass filter 9b and a high pass filter 10b with coefficients 1, 1 and 1, −1 respectively. An interpolator 13 is connected in the input to each filter 9b, 10b and the outputs of the filters are connected to an adder 14 which provides the output of the reconstruction stage.

A basic temporal filtering process relies on the continuous alignment of co-sited samples in space, here co-sited samples in successive frames of a video signal supplied to the input of the filters. Thus, the filters 9, 10 shown in FIG. 2 are implemented with frame delays (F) 15 as illustrated in FIG. 3, and the decimators 12 eliminate alternate frames output by the filters 9a, 10a of FIG. 2, the interpolators 13 inserting zero value frames corresponding to the frames eliminated by the decimators.

Consideration of FIG. 3 shows that if a pair of frames A, B are supplied in succession to the input of the decimator stage 8a, the output on the low frequency path is given by (A+B)/2. That is to say, co-sited pixels in the two frames A, B are summed on a pixel by pixel basis and divided by 2. The output on the high frequency path of the decimation stage 8a is given by (A−B)/2. That is to say, each frame B pixel is subtracted from its co-sited frame A pixel and the resulting value divided by 2. If the outputs of the decimation stage 8a are supplied to the corresponding low and high frequency paths of the reconstruction stage 8b, it will be seen that the first frame output by the adder 14 is given by (A+B)/2+(A−B)/2=A, and the second frame output by the adder 14 is given by (A+B)/2−(A−B)/2=B. Thus, the original frames A and B are reconstructed.

The simple process described above can be applied easily to a logarithmic, or wavelet decimation process in a multi-stage system by ensuring that the next stage only decimates the summed terms of the previous stage. This process for a group of eight frames $F_0$ to $F_7$ is illustrated by the schematic diagram of FIG. 4. The eight frames $F_0$ to $F_7$ are input in pairs to four decimation stages 8a forming a first stage or, the logarithmic decimation process. Each decimation stage 8a produces a low frequency output corresponding to half the sum, on a pixel by pixel basis, of the two input frames, and a high frequency output corresponding to half the difference, on a pixel by pixel basis, between the two input frames as indicated at Stage 1 in FIG. 4. The low frequency outputs of Stage 1 are then supplied in pairs to two further decimation stages 8a and are further subdivided into low and high frequency components, corresponding to sum and difference components respectively, as illustrated at Stage 2 in FIG. 4. The low frequency outputs of Stage 2 are then supplied to a further decimation stage 8a and further subdivided into a low frequency band and a high frequency band as illustrated at Stage 3 in the figure, where the low and high frequency bands are indicated simply by "+" and "−" for short.

The process shown in FIG. 4 results in progressive decimation of the low frequency bands as illustrated schematically in FIG. 5 where "L" represents low frequency, "H" represents high frequency, and $\omega_n$ is the Nyquist frequency. As indicated in FIG. 5, the LLL and LLH bands at the output of Stage 3 each consist of one frame, the LH band consists of two frames, and the H band consists of four frames. Thus, the original eight frame sequence of the video signal has been wavelet encoded along the temporal axis into four frequency sub-bands of unequal size, each sub-band representing a different temporal frequency component of the original eight frame sequence. The frames $F_0$ to $F_7$ can of course be reproduced by applying the sub-bands to a complementary multistage reconstruction filter arrangement to reverse the frequency separation process.

It has been found that even this simple process of wavelet encoding along the temporal axis produces some visual picture improvement over the purely intra-frame, i.e. spatial, coding processes described earlier, though the resultant picture quality is not to MPEG standards. In accordance with the present invention, however, as a pair of input video images is combined to produce a sum component in a difference component, corresponding to low and high frequency components respectively, at least some of the output pixels are produced by addition/subtraction of matched pixels in the two input frames, i.e. pixels which are linked by a motion vector. In other words, rather than performing temporal filtering in a direction parallel to the temporal axis, so that co-sited pixels are added or subtracted as in the simple temporal filter stage 8a described above, the present invention effectively performs temporal filtering along the direction of the motion vectors on a pixel by pixel basis. The application of motion vector assistance to the inter-frame processing enables the energy content in the high frequency signals to be substantially reduced as compared with the basic temporal filtering process described above, so that picture quality in accordance with MPEG standards can be achieved but without the disadvantages of the MPEG DPCM system illustrated in FIG. 1. In particular, the temporal filtering process is symmetric in time and is completely separable from any spatial processing of the video signal that may be performed in a compression process, it being possible in embodiments of the invention to exploit the variation in human visual responsiveness to different temporal frequency bands produced by the filtering process. There is therefore a considerable benefit to system performance.

While, in accordance with the invention, at least some of the output pixels are produced by addition/subtraction of matched pixels as described above, it will be appreciated that, for example, due to the nature of the image material and the motion vector generation process, not all of the pixels in the first input image may be matched with pixels in the second image. While various methods might be envisaged for dealing with such unmatched pixels in the first image, depending for example upon the picture quality required in a given application, it is preferred that the apparatus includes means for identifying the locations of any unmatched pixels in the first input image, and that the coding controller is arranged to control the encoder such that a pixel of the first output image co-sited with an unmatched pixel in the first input image is produced directly from the unmatched pixel.

Further, as a result of the motion vector generation process, some pixels of the first input image may be matched to more than one pixel in the second input image. While different systems might be envisaged for dealing with this problem, it is preferred that the apparatus includes means for identifying any pixel locations in the first input image which are associated with more than one motion vector, selecting, for each such pixel location, one of the associated motion rectors as a dominant vector for that pixel location, and flagging as a subordinate vector each remaining vector associated with that pixel location, and that the coding controller is arranged to control the encoder such that, where more than one vector is associated with a pixel location in the first input image, the co-sited pixel in the first output image is produced by addition of pixels associated with the dominant vector.

The invention also provides video signal decoding apparatus as set forth in claims 5 to 8 for producing decoded video images corresponding to the input video images coded by coding apparatus as described above. Further, the invention provides video signal processing apparatus comprising coding apparatus and decoding apparatus as previously described.

As indicated previously, while different methods may be envisaged for handling the problems of unmatched pixels, and pixels associated with more than one vector, which can result from the motion vector generation process, the coding and decoding system implemented by preferred embodiments of the present invention enables so-called "perfect reconstruction" of video images to be achieved as will be explained further below.

In accordance with another aspect of the invention there is provided a video signal coding method for coding first and second input video images, the method comprising:

matching pixels of the second input image with pixels of the first input image to derive motion vectors representing the motion of pixels in the second image between the two images, each motion vector being associated with the location of a pixel in the second image and the location of the matched pixel in the first image;

processing the two input images to produce first and second output video images, pixels of the first output image being produced by addition of equally weighted pixels in the two input images, and pixels of the second output image being produced by subtraction of equally weighted pixels in the two input images;

wherein each said pixel of the first output image is produced by addition of the co-sited pixel in the first input image and its matched pixel in the second input image as determined by the associated motion vector, and each said pixel of the second output image is produced by subtracking the co-sited pixel in the second input image from its matched pixel in the first input image as determined by the associated motion vector.

The invention also provides video signal decoding methods producing decoded video images corresponding to the input video images coded by the coding method according to the invention.

In general, it is to be understood that, where features are described herein with reference to an apparatus in accordance with the invention, corresponding features may be provided in accordance with a method of the invention, and vice versa.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 4 is a diagram illustrating a wavelet encoding process performed over a group of eight frames of a video signal;

DESCRIPTION OF THE PREFERRED EMBODIMENTS

Figure 6:
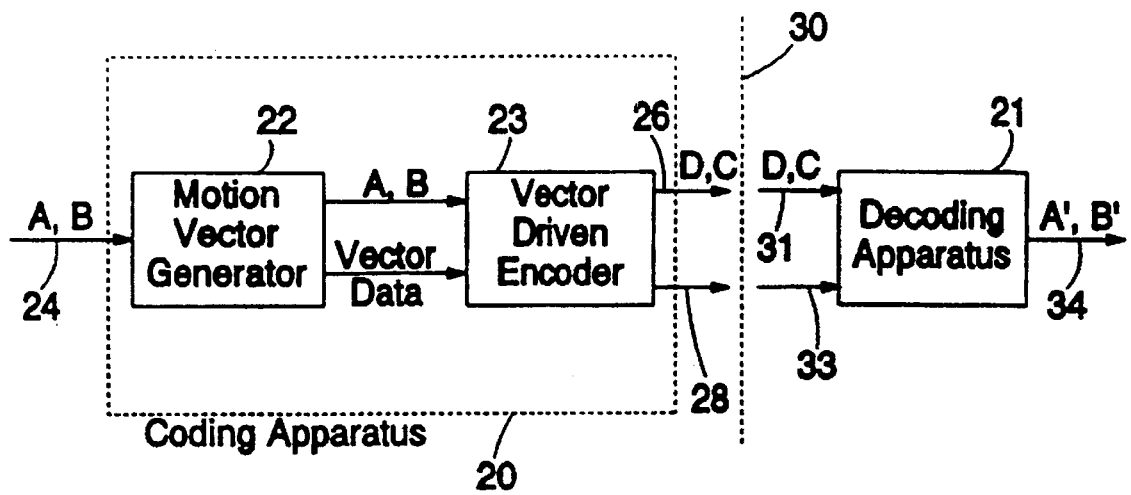
FIG. 6 is a schematic block diagram of the video signal processing apparatus embodying the invention.

The video signal processing apparatus shown in FIG. 6 comprises motion compensated coding apparatus 20 and motion compensated decoding apparatus 21. The motion compensated coding apparatus 20 comprises a motion vector generator 22 and a vector driven encoder 23. Input video images, here video frames A, B supplied to an input 24 of the coding apparatus 20, are supplied to the motion vector generator 22 which generates motion vectors representing the motion of the image content between the two input frames. The motion vectors are processed as described further below, and the resulting vector data is supplied to the vector driven encoder 23 which also receives the input frames A, B from the motion vector generator 22. The vector driven encoder 23 is essentially a vector driven decimation filter stage which performs temporal filtering of the input frames A, B along the direction of the motion vectors to produce two output frames, C and D, on an output 26 thereof.

The vector data produced by the motion vector generator 22 and supplied to the vector driven encoder 23 is passed on to an output 28 of the coding apparatus. The vector data on the output 28, together with the frames C and D supplied to the output 26, are output by the coding apparatus 20 for storage, transmission, further processing, etc. 30.

The motion compensated decoding apparatus 21 is essentially a vector driven reconstruction filter stage for receiving the frames C and D, and the vector data originally generated by the coding apparatus 20, on respective inputs 31 and 33 thereof. The decoding apparatus 21 combines the frames C and D in dependence upon the motion vectors to produce decoded, or reconstructed frames A', B' corresponding to the original input video frames A, B. The decoded frames A', B', which in this embodiment constitute perfect reproductions of the original frames A, B, are supplied to an output 34 of the decoding apparatus.

Before describing the construction and operation of the coding apparatus 20 and decoding apparatus 21 in more detail, the basic principle of the coding and decoding processes will be explained with reference to the simplified diagrammatic representation of FIG. 7.

Figure 7:
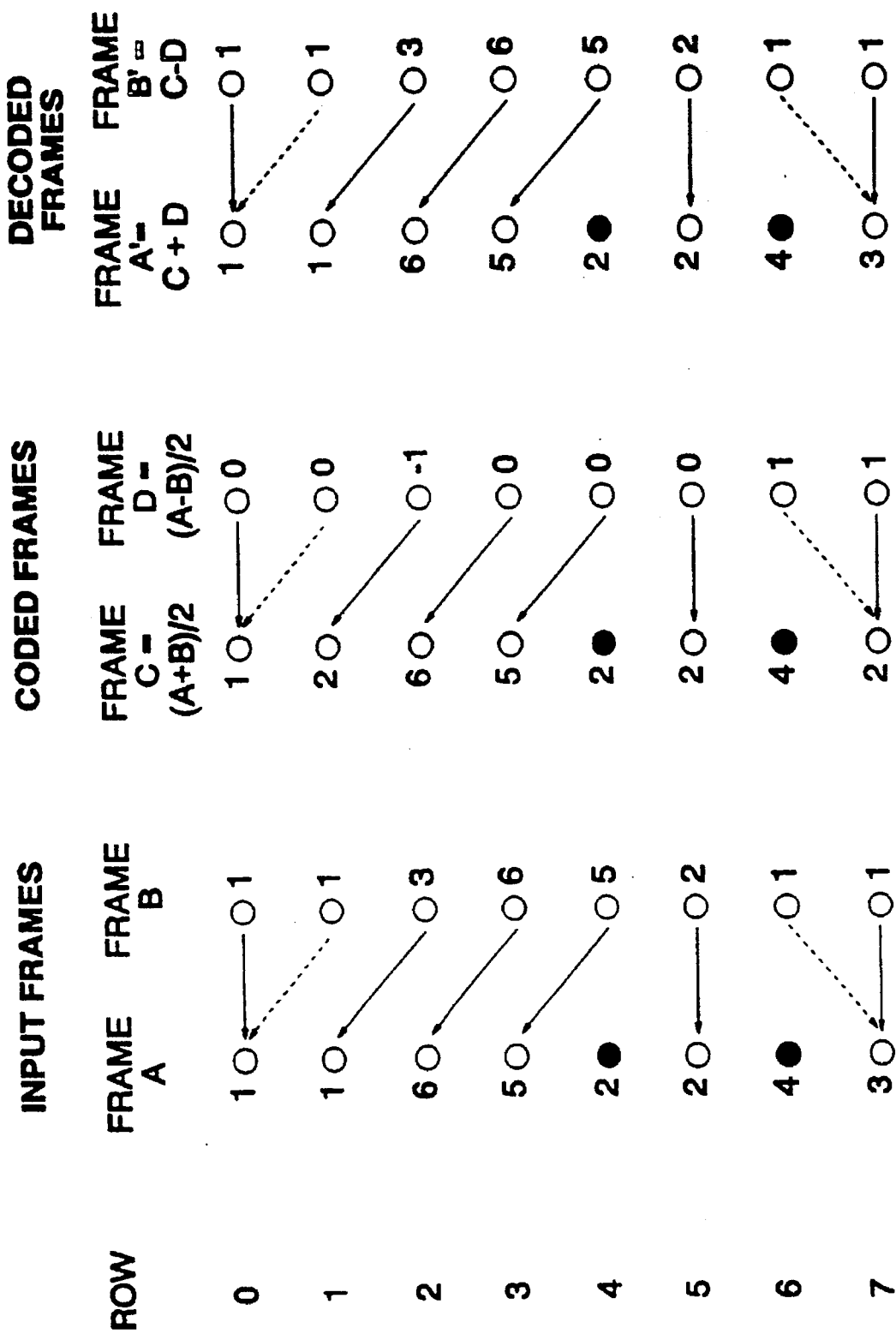
FIG. 7 is a simplified diagrammatic illustration of the coding and decoding processes performed by the apparatus of FIG. 6.

FIG. 7 represents pixels of the input frames A, B supplied to the coding apparatus 20, pixels of the coded frames C, D output by the coding apparatus 20, and pixels of the decoded frames A', B' output by the decoding apparatus 21, the pixels being represented by circles in the figure. Each frame A, B, C, D, A', B' is represented in a one-dimensional sense for ease of explanation, so that each frame is shown as a single column of pixels. The left-hand column in FIG. 7 indicates the row number of pixels in the one-dimensional array representing each frame, and the numbers shown next to the pixels of each frame indicate the pixel values. While the principle of operation of the processing apparatus will be described with reference to this one-dimensional representation, in practice, of course, the process operates in two dimensions since each frame comprises a two-dimensional array of pixels.

Considering first the input frames A, B, the motion vector generator 22 of the coding apparatus 20 derives motion vectors, represented by arrows in the figure, representing the motion of each pixel in the second frame, frame B, between that frame and the first frame, frame A. (Either one of the frames A, B may of course be temporally first in terms of the image sequence represented by the video signal). As discussed further below with reference to FIG. 9, this process is performed by matching pixels of frame B with pixels of frame A. A motion vector is derived for each frame B pixel and links that pixel with its matched pixel in frame A. Thus, for example, the frame B pixel at row 0 is matched with the frame A pixel at row 0 in the figure, and the frame B pixel at row 2 is matched with the frame A pixel at row 1, etc.

Due to the nature of the image material and the motion vector estimation process, while each frame B pixel has an associated motion vector, some frame A pixels remain unmatched, i.e. not matched to a frame B pixel. For these pixels, indicated as solid circles in the figure, there is therefore no associated motion vector. Similarly, some frame A pixels will be matched to more than one frame B pixel, so that these pixels are associated with more than one motion vector. For these pixels, e.g. at row 0 and row 7 of frame A in the figure, one of the associated motion vectors is selected as a dominant vector, and the or each remaining vector is flagged as a subordinate vector as explained further below. (Of course, where there is only one vector associated with a frame A pixel, that vector is a dominant vector and there is no subordinate vector). In the figure, subordinate vectors are indicated by broken lines, the solid lines representing dominant vectors.

The coding apparatus 20 operates to generate the output frames C, D from the input frames A, B as follows. Pixels of the first output frame, frame C, are generated by addition of equally weighted pixels in the two input frames A, B, except for frame C pixels co-sited with (i.e. at the same position as) unmatched pixels in frame A. Specifically, considering first frame C pixels which are co-sited with matched frame A pixels, each of these frame C pixels is produced by addition of the co-sited pixel in frame A and its matched pixel in frame B as determined by the associated motion vector. If more than one vector is associated with the appropriate frame A pixel, then the dominant vector is used. The frame A and frame B pixels summed to produce the frame C pixel are equally weighted by a factor of x, where x=½ to prevent arithmetic overflow. The weighting can be performed either before or after (but is preferably performed after) the summation. Thus, considering for example the frame C pixel in row 0, the output pixel value is obtained by summing the frame A pixel in row 0 and the frame B pixel in row 0 and dividing by 2, giving an output pixel value of 1 as indicated in the figure. The frame C pixel at row 1 is produced by adding the value of the frame A pixel at row 1 and the frame B pixel at row 2, and dividing by 2, to give an output pixel value of 2 as indicated in the figure.

(As indicated above, a weighting factor of x=½ is used in this preferred embodiment for producing frame C pixels to prevent arithmetic overflow. However, this can result in fractional values and in embodiments with insufficient resolution to cope with this small rounding errors can be introduced. As an alternative therefore, a weighting factor of x=1 may be used in producing the frame C pixels if the arithmetic process can accept the larger values. A scaling factor of ½ should then be applied after the decoding process described below. Numerical accuracy is thus preserved and perfect reconstruction can be achieved).

A frame C pixel co-sited with an unmatched pixel of frame A is produced directly from the unmatched A frame pixel, in this case with a weighting factor of twice that used for producing the other frame C pixels, i.e. with a weighting factor of 2x=2 times ½=1 in this preferred embodiment. Thus, for example, the frame C pixel in row 4 simply takes the value of the unmatched frame A pixel at row 4, and the frame C pixel at row 6 takes the value of the unmatched frame A pixel in row 6 as indicated in the figure.

Pixels of the second output frame, frame D, are generated by the encoder 23 by subtraction of respective equally weighted pixels in the two input frames A and B. In particular, each frame D pixel is produced by subtracting the co-sited frame B pixel from its matched pixel in frame A as determined by the associated motion vector, whether dominant or subordinate. The weighting factor here is x, i.e. ½ in this preferred embodiment. Thus, each frame D pixel is produced by multiplying the frame A and B pixels by a factor of x=½ either before or (more preferably) after the subtraction. For example, the frame D pixel in row 0 is produced by subtracting the frame B pixel in row 0 from the frame A pixel in row 0 and dividing by 2, giving an output pixel value of 0 as indicated in the figure. The frame D pixel in row 2 is obtained by subtracting the frame B pixel in row 2 from the frame A pixel in row 1 and dividing by 2, giving a frame D pixel value of −1 as indicated in the figure. The frame D pixel in row 6 is produced by subtracting the frame B pixel in row 6 from the frame A pixel in row 7 and dividing by 2, to give a frame D pixel value of 1 and so on.

Figure 1:
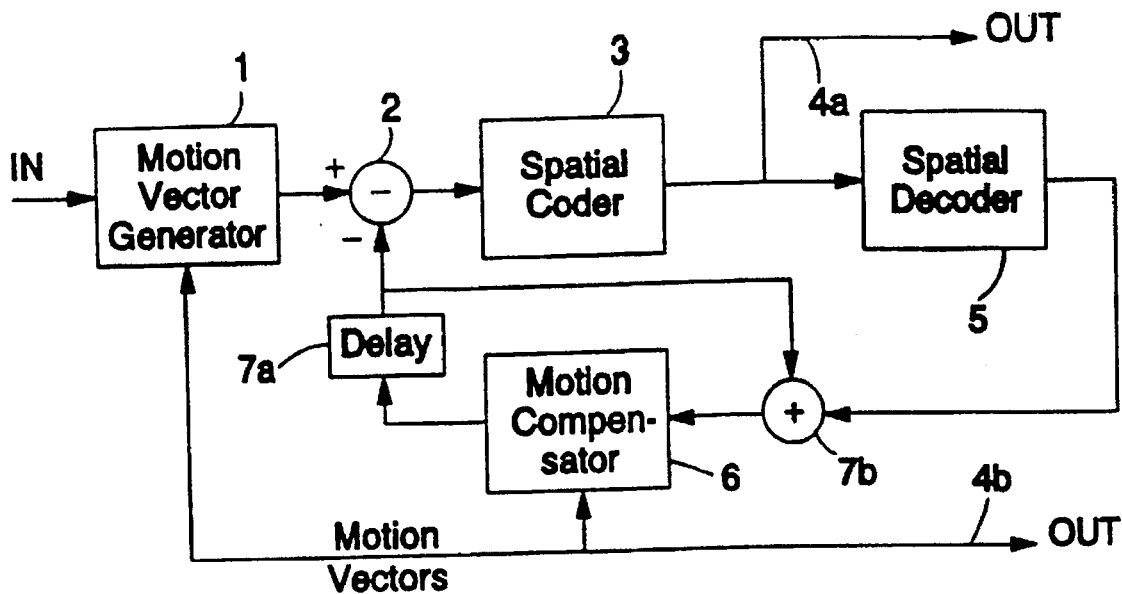
FIG. 1 is a simplified block diagram of a previously proposed video signal coding apparatus.
Figure 2:
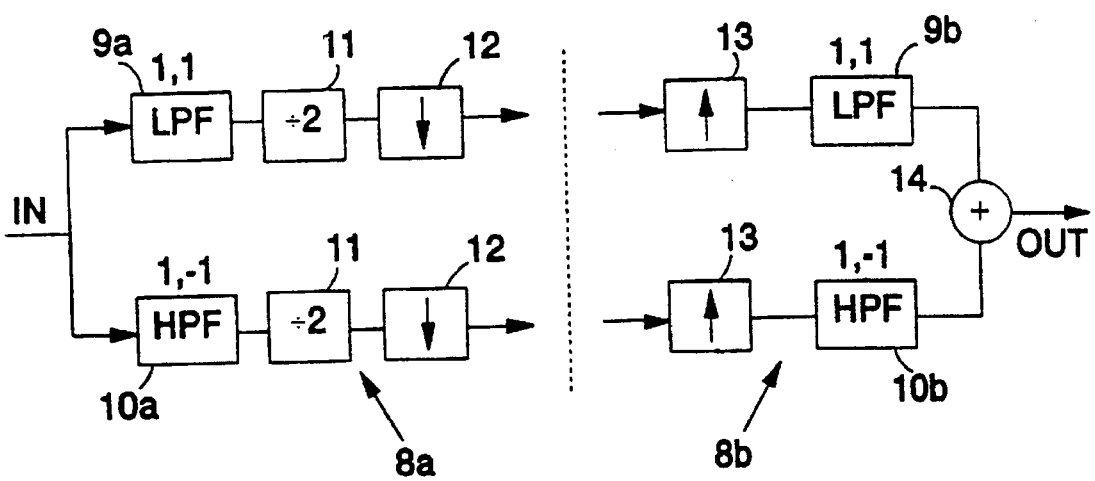
FIG. 2 is a block diagram of a simple Haar filter system for decimation and reconstruction of video signals.
Figure 3:
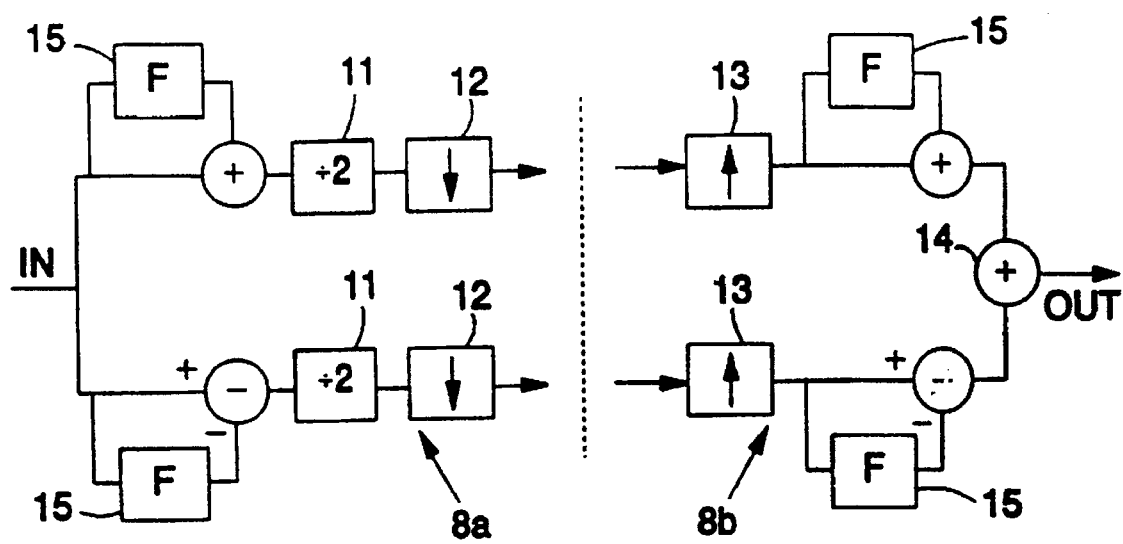
FIG. 3 is a more detailed block diagram of the filter system FIG. 2.
Figure 5:
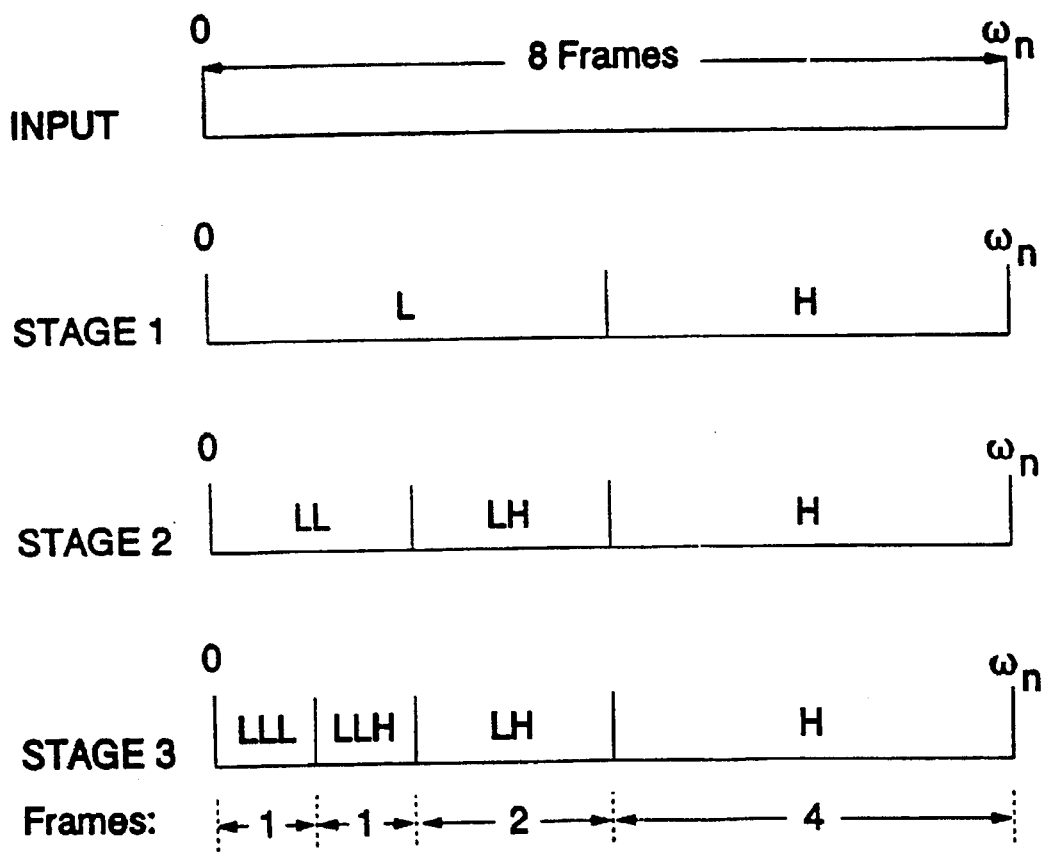
FIG. 5 is a schematic illustration of the sub-band frequency separation performed by the wavelet encoding process of FIG. 4.

It will be seen from FIG. 7 that the action of the encoder 23 is that of a vector driven filter stage corresponding generally to the operation of the Haar filter stage 8a described with reference to FIGS. 2 and 3 but with the temporal filtering performed along the direction of the motion vectors and with special coding rules applied to unmatched frame A pixels. Thus, frame C corresponds generally to a sum frame, (A+B)/2, as indicated in FIG. 7, and thus corresponds to a low frequency component of the input frame pair. Similarly, frame D corresponds to a difference frame, indicated generally as a (A−B)/2 in the figure, and thus corresponds to a high frequency component of the input frame pair. The effect of the encoder is therefore to split the input frame pair into two temporal frequency sub-bands.

The right-hand side of FIG. 7 illustrates the decoded frames A' and B' produced by the decoding apparatus 21 in FIG. 6. As previously indicated, in this particular preferred embodiment, the decoded frames A', B' constitute perfect reconstructions of the original input frames A, B. The reconstructed frames A' and B' are generated from the encoded frames C and D in dependence upon the motion vectors derived for the original input frames A, B. Thus, while the motion vectors were referred to above as associated with particular pixels in the input frames A and B for ease of explanation, the motion vectors are in fact associated with pixel locations in the input frames. For ease of understanding, FIG. 7 shows the motion vectors related to the corresponding pixel locations in the coded frames C and D and the decoded frames A' and B'.

The decoding apparatus 21 generates pixels of the decoded frames A', B' from the coded frames C and D as follows. Pixels of the first decoded frame A' are generated by addition of respective equally weighted pixels of the frames C and D, except that any A' frame pixel corresponding to an unmatched pixel in the original input frame A is produced directly from the co-sited pixel in frame C. More specifically, considering first A' frame pixels corresponding to matched A frame pixels, each such pixel is produced by addition of the co-sited C frame pixel and the D frame pixel at the matched pixel location for the A frame pixel corresponding to the A' frame pixel to be produced as determined by the associated motion vector. Where the corresponding A frame pixel is associated with more than one motion vector, the dominant vector is used. The frame C and D pixels added to produce the frame A' pixel are weighted by multiplying the pixel values by a weighting factor of 2x, i.e. 2 times ½=1 in this embodiment, thus ensuring no overflow or rounding errors. Thus, for example, the frame A' pixel in row 0 is produced by addition of the frame C pixel in row 0 and the frame D pixel in row 0 to give a reconstructed pixel value of 1 as indicated. Similarly, the frame A' pixel in row 1 is produced by addition of the frame C pixel in row 1 and the frame D pixel in row 2, to give a reconstructed pixel value of 1 as indicated.

Frame A' pixels corresponding to unmatched A frame pixels are produced directly from the co-sited frame C pixels, again with a weighting factor of 2x, i.e. 1 in this case. Thus, the frame A' pixel in row 4 simply takes the value of the frame C pixel in row 4, and the frame A' pixel in row 6 takes the value of the frame C pixel in row 6 as indicated in the figure.

Pixels of reconstructed frame B' are produced differently depending upon whether the corresponding pixels in frame B are associated with dominant or subordinate vectors. Considering first frame B' pixels corresponding to frame B pixels at locations associated with dominant vectors, each such frame B' pixel is produced by subtraction of equally weighted pixels in the two frames C and D. In particular, each such frame B' pixel is produced by subtracting the co-sited pixel in frame D from the frame C pixel at the matched pixel location for the frame B pixel corresponding to the frame B' pixel to be produced as determined by the associated motion vector. Again, the weighting factor is 2x, i.e. 1 in this case. Thus, for example, the frame B-pixel in row 0 is produced by subtracting the frame D pixel in row 0 from the frame C pixel in row 0, to obtain a reconstructed pixel value of 1 as indicated. The frame B' pixel in row 3 is obtained by subtracting the frame D pixel in row 3 from the frame C pixel in row 2, giving a reconstructed pixel value of 6 as indicated.

Production of frame B' pixels corresponding to frame B pixels at locations associated with subordinate vectors requires access to the decoded frame A' in this embodiment. Thus, frame A' is produced prior to frame B'. Such frame B' pixels are produced by subtracting the co-sited pixel in frame D from the frame A' pixel at the matched pixel location for the frame B pixel corresponding to the pixel to be produced as determined by the associated motion vector. The frame D and A' pixels are appropriately weighted prior to the subtraction, the weighting factor being 2x, i.e. 1, for the frame A' pixel and 4x, i.e. 2, for the frame D pixel. Thus, for example, the frame B' pixel in row 1 is produced by multiplying the frame D pixel in row 1 by 2 and subtracting the resulting value from the frame A' pixel in row 0 to give a frame B' pixel value of 1 as indicated. Similarly, the frame B' pixel in row 6 is generated by multiplying the frame D pixel in row 6 by 2 and subtracting the resulting value from the frame A' pixel in row 7 to give a reconstructed pixel value of 1 as indicated.

It will be seen from FIG. 7 that the action of the decoding apparatus 34 is that of a vector driven reconstruction filter stage corresponding generally to the operation of the Haar filter stage 8b described with reference to FIGS. 2 and 3, but with the temporal filtering performed along the direction of the motion vectors, and with special coding rules applied to unmatched frame A' pixels and frame B' pixels at locations associated with subordinate vectors. Thus, frame A' corresponds generally to a sum frame (C+D) as indicated in FIG. 7, and frame B' corresponds generally to a difference frame (C−D) as indicated in FIG. 7. However, comparison of frames A', B' and frames A and B will show that, in this preferred embodiment, the special coding rules applied in relation to unmatched pixel locations and subordinate vectors, in conjunction with the weighting factors used at each stage of the process, results in perfect reconstruction of the original input frames A and B. That is to say, frame A' is a perfect reconstruction of frame A, and frame B' is a perfect reconstruction of frame B.

The operation of the above described system can be confirmed using all the sample values shown in FIG. 7. Of course, as indicated previously, in practice each frame is a two-dimensional array of pixels, but the operation of the system in two dimensions can be easily visualised from the simplified one-dimensional example described above.

Figure 8:
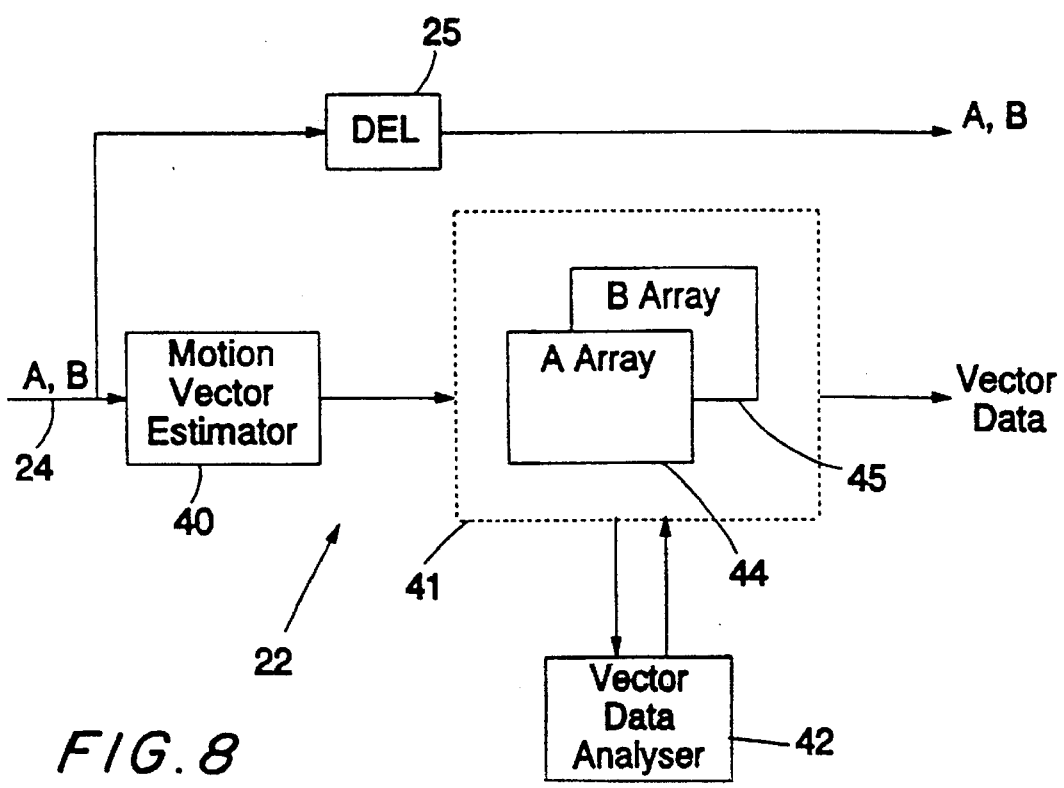
FIG. 8 is a schematic block diagram of a motion vector generator of the apparatus of FIGS. 6.

The motion vector generator 22 of the coding apparatus 20 is shown in more detail in FIG. 8. The motion vector generator comprises a motion vector estimator 40, a vector data store 41, and a vector data analyser 42. The motion vector estimator 40 receives the input frames A, B and generates motion vectors representing the motion of the image content between the two frames. In particular, the motion vector estimator matches pixels of the frame B with pixels of the frame A to derive motion vectors representing the motion of frame B pixels between that frame and frame A. Suitable motion vector estimation processes are well known. Briefly, however, the motion vector estimator operates by comparing the content of blocks of pixels in frame B with blocks of pixels in frame A to determine which position of the frame B block in frame A corresponds to the best match. This process is known as block matching. The best match can be determined by calculating, for each position of the frame B block in frame A, the absolute difference between the compared blocks, i.e. the sum of the absolute differences between corresponding pixels in the two frames over the area of the block. (An alternative method uses the mean square error (mse) technique where the differences between corresponding pixels are first squared, resulting always in a positive value, before adding in an accumulator). The lowest absolute difference value (or lowest error in the mse technique) thus represents the best match, and the motion vector is determined as the displacement (in terms of number of pixels horizontally and vertically) between the position of the frame B block and the position of the matched frame A block. Thus, motion vectors are in fact associated with a block of frame B pixels (typically a block of 16 by 16 pixels) as opposed to individual pixels, but each motion vector is then used for all frame B pixels in that block, so that a motion vector is effectively derived for each frame B pixel. For each frame B pixel, the associated motion vector "points to" (i.e. gives the vector offset of) the matched frame A pixel as determined by the block matching process.

As described with reference to FIG. 7, for the subsequent processing operation, the motion vectors associated with given pixel locations in frames A and B must be known. To this end, as each motion vector is determined by the motion vector estimator 40, the vector is recorded for the associated A and B pixel locations by the vector data store 41. The vector data store 41 comprises two memory arrays, an A array 44 and a B array 45. The A array 44 contains an array location for each pixel location of frame A, and the B array 45 contains an array location for each pixel location of frame B. A motion vector supplied by the motion vector estimator 40 to the vector data store 41 is stored at a location in the A array 44 corresponding to the A pixel location associated with the motion vector, and also in the B array 45 at a location corresponding to the B pixel location associated with the motion vector. Thus, when the motion vector estimation process is complete, the B array 45 contains a motion vector corresponding to each B pixel location, and the A array 44 contains a motion vector for all matched A frame pixel locations. Any memory location in the A array 44 not containing a motion vector indicates an unmatched A pixel location.

As described with reference to FIG. 7, the subsequent processing also requires a distinction to be made between dominant and subordinate vectors. Thus, after storage of the vectors in the vector store 41, the vector data analyser 42 cycles through the data stored in the A array 44 for all A pixel locations. If more than one vector is associated with any A pixel location, the vector data analyser selects the vector of lowest magnitude (i.e. representing the lowest vector offset) as a dominant vector. (If there is more than one vector with this lowest magnitude, then any of these may be selected as a dominant vector). Each of the remaining vectors, i.e. those not selected as a dominant vector, corresponds to a subordinate vector and these vectors must be flagged as such for the subsequent processing. Thus, for each subordinate vector at an A pixel location in the A array 44, the vector data analyser 42 calculates, from the A pixel location and the motion vector, the matched B pixel location. The vector data analyser then accesses the appropriate B pixel location in the B array 45, and sets a flag against the vector stored at that location to indicate that the vector is a subordinate vector. The vector data analyser then re-accesses the corresponding A pixel location in the A array 44 and deletes all but the dominant vector.

When this process has been repeated for all A pixel locations, the A array 44 holds only dominant vectors associated with each matched A pixel location, and the B array 45 holds the vector associated with each B pixel location together with the subordinate vector flags indicative of subordinate vectors where appropriate. It will of course be appreciated that, rather than flagging subordinate vectors, dominant vectors could be flagged as such. Similarly, rather than relying on an "empty" A array location to indicate an unmatched A pixel location, an "unmatched flag" could be set at those A array locations corresponding to unmatched pixel locations. Moreover, different methods for selecting dominant vectors could be used. For example, the motion vector generator could be arranged to select as the dominant vector the vector which corresponds to the lowest absolute difference value or the lowest mse value referred to above, i.e. the vector corresponding to the "best match".

Once the vector data (comprising the motion vectors and associated A and B pixel locations) has been determined as described above, the vector data is output by the motion vector generator 22 to the vector driven encoder 23 of FIG. 6. The original input frames A, B are also output by the motion vector generator 22 to the vector driven encoder 23 via a delay 25 which delays the input frames in accordance with the processing time of the motion vector estimator and vector data analyser.

Figure 9:
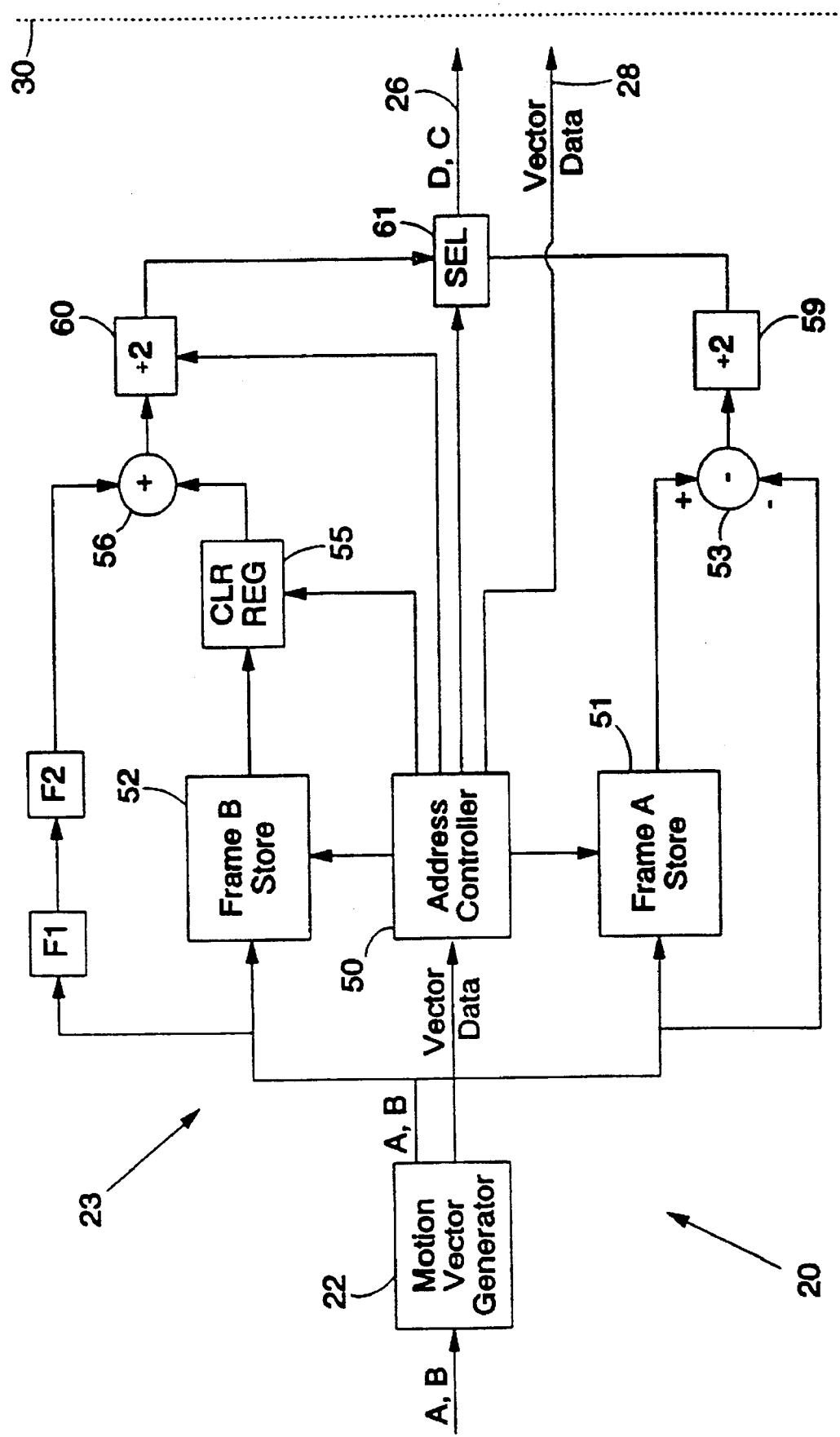
FIG. 9 is a schematic block diagram of coding apparatus forming part of the processing apparatus of FIG. 6.

The coding apparatus 20, comprising the motion vector generator 22 and the vector driven encoder 23, is shown in more detail in FIG. 9. The vector driven encoder 23 comprises an address controller 50 which receives the vector data from the motion vector generator 22. The address controller 50 controls writing and reading of data to two frame stores, a Frame A store 51 and a Frame B store 52. The frame stores 51 and 52 ape connected to receive the input frames A, B from the motion vector generator 22. The output of the Frame A store 51 is connected to the positive input of a subtracter 53, the negative input of which is connected to receive the input frames directly from the motion vector generator 22. The output of the Frame B store 52 is connected to a clear register (CLR REG) 55 which is controlled by the address controller 50 as will be explained below. The output of the clear register 55 is connected to one input of an adder 56 the other input of which is connected to receive the input frames via two one-frame delays F1 and F2. The outputs of the subtracter 53 and adder 56 are connected to respective divide-by-two units 59 and 60, the unit 60 being controlled by the address controller 50. The outputs of the divide-by-two units 59 and 60 form the inputs to selector (SEL) 61 which, under control of the address controller 50, selectively connects one of its inputs to the output 26 of the coding apparatus. A further output of the address controller 50 forms the output 28 of the coding apparatus on which the vector data is output for storage, transmission, further processing, etc. 30 together with the frames C and D supplied to the output 26.

The operation of the coding apparatus 20 is as follows. The input frames A, B are supplied to the motion vector generator 22 which generates the vector data as previously described with reference to FIG. 8. The input frames A, B are delayed by the motion vector generator 22 to allow for generation of the vector data, and the delayed frames are output with the vector data to the vector driven encoder 23. The vector data is stored in the address controller 50. As the first frame, frame A, is supplied to the encoder 23, this frame is input to the frame delay F1 and also to the Frame A store 51 which is enabled by the address controller 50. As frame B is output by the motion vector generator 22, this frame is input to the frame delay F1 as frame A is output by the delay F1 to the delay F2. Frame B is also written to the Frame B store 52, which is enabled at the appropriate time by the address controller 50, and is also supplied directly to the negative input of the subtracter 53.

Encoded, frame D is generated first on the output 26 of the apparatus, followed by encoded frame C. The pixels of these output frames are generated as previously described with reference to FIG. 7. Generation of the frame D by the lower portion of the coding apparatus 20 of FIG. 9 will be described first.

The D frame pixels are generated as frame B is output by the motion vector generator 22 and supplied to the negative input of the subtracter 53 on a pixel by pixel basis. Frame A is already stored in the Frame A store at this time. As each B frame pixel is supplied to the subtracter 53, the address controller 50 controls the Frame A store 51 to output the matched A frame pixel as determined by the associated motion vector. Since the B frame pixels are supplied sequentially to the subtracter 53, the location of the B frame pixel output at any time is known. The location of the appropriate A frame pixel to be output can therefore be calculated by the address controller 50 from the B pixel location and the associated motion vector as indicated by the vector data. Thus, as each B frame pixel is supplied to the negative input of the subtracter 53, its matched A frame pixel, as determined by the associated motion vector, is supplied to the positive input of the subtracter 53. The B frame pixel is therefore subtracted from its matched A frame pixel and the resulting value is supplied to the divide-by-two unit 59. The unit 59 serves to weight the input pixel values by multiplying by a factor of ½ and the resulting value is supplied to the selector 61 as a pixel of frame D. Thus, each frame D pixel is generated by subtracting the co-sited frame B pixel from its matched pixel in frame A, and dividing by 2, as previously described with reference to FIG. 7. The selector 61 is controlled by the address controller 50 to connect the output of the divide-by-two unit 59 to the output 26 of the apparatus during this process. Successive pixels of frame D are therefore supplied to the output 26.

The generation of frame D as described above is performed as frame B is being output by the motion vector generator 22. At the end of this process, frame B is stored in the Frame B store 52 and the delay F1, and frame A is stored in the delay F2. Generation of encoded frame C by the upper portion of the coding apparatus 20 can then commence.

As the next frame (in a continuous sequence of frames processed by the coding apparatus 20) is output by the motion vector generator 22, frame A will be output on a pixel by pixel basis by the delay F2. Considering first matched A frame pixels, as each such A frame pixel is output by the delay F2, its matched pixel in frame B is read out from the Frame B store 52 under control of the address controller 50. Since frame A is output pixel by pixel by the delay F2, the address controller 50 determines the location of the B frame pixel to be output from the location of the A frame pixel and the motion vector associated with that A pixel location as indicated by the vector data. Thus, as each A frame pixel is supplied to one input of the adder 56, its matched B frame pixel, as determined by the associated motion vector, is read out of the Frame B store 52 and supplied, via the clear register 55, to the other input of the adder 56. The pixel values are summed by the adder 56, weighted by a factor of ½ by the divide-by-two unit 60, and supplied to the selector 61 as a pixel of frame C. This process is repeated for successive A frame pixels (apart from unmatched pixels as discussed further below) to produce successive C frame pixels.

Thus, each C frame pixel co-sited with a matched A frame pixel is generated by summing the co-sited A frame pixel and its matched pixel in frame B as determined by the associated dominant motion vector, and dividing by 2, as previously described with reference to FIG. 7. However, if the vector data stored by the address controller 50 indicates that a particular A frame pixel to be output by the delay F2 is an unmatched pixel (as indicated by the absence of an associated motion vector for that pixel location or an unmatched pixel flag as described earlier), then the address controller 50 activates the clear register 55 to output a zero-value sample to the adder 56. The address controller 50 further controls the divide-by-two unit 60 to adjust the weighting factor to unity, i.e. to cancel the divide by 2 operation, for that pixel, so that the unmatched A frame pixel is output directly as the co-sited C frame pixel as described with reference to FIG. 7. Thus, frame C is generated on a pixel by pixel basis on the output 26 the selector 61 being controlled by the address controller 50 to connect the output of the divide-by-two unit 60 to the output 26 of the apparatus during this process.

It will be seen from the above that the encoded frames C and D are generated, in accordance with the system of FIG. 7, the encoded frames C and D corresponding to low and high temporal frequency components of the original input frame pair A, B as previously described. The frames D, C are, output sequentially by the selector 61, together with the vector data output by the address controller 50, for onward transmission, storage, further processing 30, etc. (It will be appreciated that the order D, C of the coded frames on the output 26 is purely a matter of the implementation shown in FIG. 9 and is not fundamental to the operation. Addition of appropriate delay units in the lower path could easily change the order to C, D).

Figure 10:
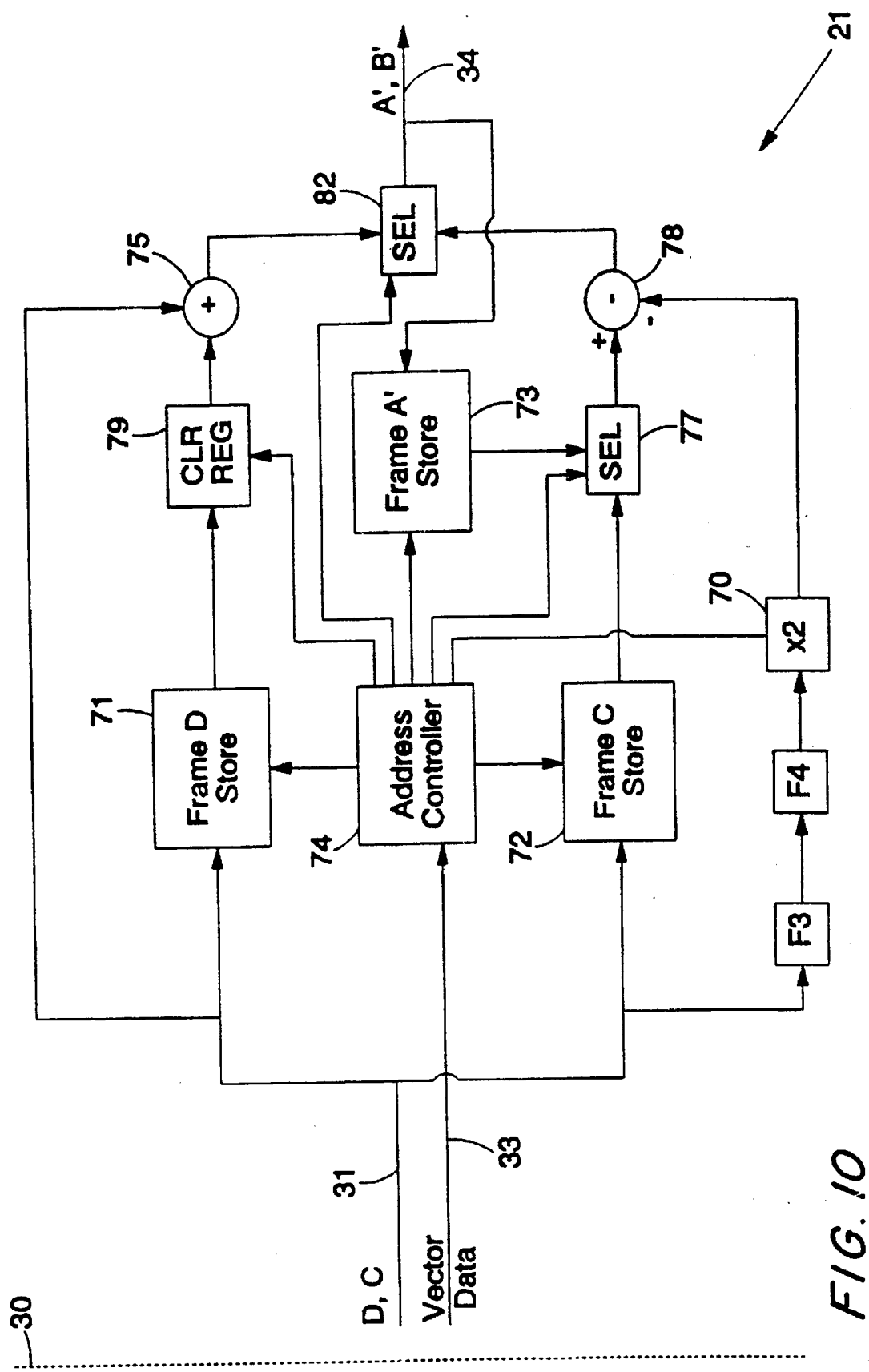
FIG. 10 is a schematic block diagram of decoding apparatus of the processing apparatus of FIG. 6.

FIG. 10 shows the motion compensated decoding apparatus 21 of FIG. 6 for producing the decoded frames A', B' corresponding to the original input frames A, B coded by the coding apparatus 20. The decoder comprises three frame stores, a Frame C store 72, a Frame D store 71, and a Frame A' store 73. A decoding controller in the form of an address controller 74 is arranged to receive the vector data, comprising the motion vectors associated with pixel locations in the original input frames A, B, and controls writing and reading of data to and from the frame stores 71 to 73.

The Frame D store 71 is connected to receive the coded frames on the input 31, the output of the Frame D store 71 being connected to a clear register (CLR REG) 79 which is controlled by the address controller 74. The output of the clear register 79 is connected to one input of an adder 75. The other input of the adder 75 is connected directly to the input 31. The Frame C store 72 is connected to receive the coded frames on the input 31, and the output of the Frame C store is connected, via a selector 77, to the positive input of a subtracter 78. The negative input of the subtracter 78 is connected to the input 31 via two one-frame delays F3 and F4 and a multiply-by-two unit 70 which is controlled by the address controller 74. The outputs of the adder 75 and subtracter 78 are connected to respective inputs of a selector 82 which is controlled by the address controller 74 to selectively connect one of its inputs to its output which forms the output 34 of the decoding apparatus 21. The output 34 is also connected to an input of the Frame A' store 73 which, in turn, has an output connected to a second input of the selector 77. The selector 77 is controlled by the address controller 74 to connect one of its inputs to its output, and hence to the subtracter 78.

In operation, after storage, transmission, processing, etc. 30, the coded frames D, C output by the coding apparatus 20 are supplied in sequence to the input 31 of the decoding apparatus 21. Similarly, the vector data generated by the coding apparatus from the original input frames A, B is supplied to the address controller 74 via the input As frame D is input, this frame is written to the Frame D store 71, under control of the address controller 74, and is also input to the frame delay F3. As frame C is input next, this frame is stored in the Frame C store 72 and is also supplied directly to the adder 75. At the same time, frame C is input to the frame delay F3 as frame D is output thereby to the frame delay F4.

As previously described with reference to FIG. 7, the decoded frame A' is generated prior to frame B', and A' frame pixels are generated by addition of equally weighted pixels in the coded frames C, D but with a different coding rule applied to a' frame pixels corresponding to unmatched pixels in the original input frame A. In particular, each A' frame pixel which does not correspond to an unmatched A frame pixel is produced by addition of the co-sited C frame pixel and the D frame pixel at the matched pixel location for the pixel to be reconstructed as determined by the associated motion vector, where the weighting factor is unity in this embodiment. Referring to FIG. 10, frame A' is generated as frame C is supplied on a pixel by pixel basis to the adder 75 from the input 31. Frame D is already stored in the Frame D store 71 at this stage. As each C frame pixel is supplied to the adder 75, the address controller 74 controls the Frame D store 71 to output the D frame pixel at the location of the matched pixel for the pixel to be reconstructed. Since the A' frame pixel to be reconstructed is co-sited with C frame pixel currently supplied to the adder 75, the address controller determines the location of the appropriate D frame pixel from the C pixel location and the dominant motion vector associated with that location in the original input frame A. The D frame pixel is supplied via the clear register 79 to the other input of the adder 85. These pixels are therefore added and supplied to the output 34 of the apparatus via the selector 82 as an A' frame pixel. This process is repeated as frame C is input on a pixel by pixel basis to generate successive A' frame pixels on the output However, if the location of a C frame pixel supplied to the adder 75 corresponds to that of an unmatched pixel in the original input frame A, as indicated by the vector data stored in the address controller 74, then the address controller 74 activates the clear register 79 to output a zero-value sample to the adder 75. The A' frame pixel generated on the output 34 of the adder 82 is then simply the co-sited C frame pixel.

The decoded frame A' is therefore generated on a pixel by pixel basis by the decoding apparatus 21 in accordance with the system described with reference to FIG. 7. As frame A' is generated, the address controller 74 enables the Frame A' store 73 so that frame A' is written to this store 73. Thus, when frame A' has been output by the decoding apparatus 21, frame A' is stored in the Frame A' store 73, frame C is stored in the Frame C store 72, and frame D is held by the frame delay F4.

As the next coded frame pair (in a continuous sequence) is supplied to the decoding apparatus 21, frame D is output on a pixel by pixel basis by the delay F4 and the pixels are selectively weighted by a factor of 1 or 2 in the multiplier 70 and supplied to the negative input of the subtracter 78. For each D frame pixel output by the delay F4, the address controller 74 controls the Frame C store 72 and the Frame A' store 73 to output the appropriate C frame pixel and A' frame pixel to be selectively combined with the D frame pixel via the selector 77 to generate a pixel of frame B'. As previously described with reference to FIG. 7, B' frame pixels corresponding to B frame pixels at locations associated with dominant vectors are produced by subtracting the co-sited D frame pixel from the C frame pixel at the matched pixel location for the pixel to be reconstructed as determined by the associated motion vector. Since the location of the frame D pixel output at any time by the delay F4 is known, the address controller 74 determines the location of the appropriate C frame pixel from the motion vector associated with that D frame pixel location in the original input frame B. The appropriate C frame pixel is output by the Frame C store 72 to one input of the selector 77, and the corresponding A' frame pixel is output by the Frame A' store 73 to the other input of the selector 77. Since it is the C frame pixel that is required in this case, the address controller 74 controls the selector 77 to supply the C frame pixel to the positive input of the subtracter 78. Similarly, the address controller 74 controls the multiplier 70 to adjust the weighting factor to unity, i.e. to cancel the multiply-by-2 operation, so that the D frame pixel is supplied directly to the negative input of the subtracter 78. In these cases therefore, the subtracter 78 operates to subtract the D frame pixel from the appropriate C frame pixel to generate the B' frame pixel on the output 34, the selector 82 being controlled by the address controller to connect the output of the subtracter 78 to the output 34 of the apparatus.

This process is repeated for all D frame pixels output by the delay F4 to produce co-sited B' frame pixels corresponding to B frame pixels associated with dominant vectors. However, where the B' frame pixel to be reconstructed, and hence the D frame pixel currently output by the delay F4, corresponds to a B frame pixel at a location associated with a subordinate vector (as indicated by a subordinate vector flag in the vector data supplied to the address controller 74), then the B' frame pixel is generated by combining appropriately weighted pixels of frame D and frame A'. In particular, as described with reference to FIG. 7, each such B' frame pixel is generated by subtracting the co-sited D frame pixel, multiplied by a weighting factor of 2, from the A' frame pixel at the matched pixel location for the pixel to be reconstructed as determined by the associated motion vector. For such a B' frame pixel, as the co-sited D frame pixel is output by the delay F4, the address controller 74 controls the multiplier 70 to effect the multiply-by-2 operation, and the weighted D frame pixel is supplied to the negative input of the subtracter 78. The address controller also controls the selector 77 so that the appropriately located A' frame pixel, rather than the C frame pixel, supplied thereto is output to the positive input of the subtracter 78. Again, the location of the appropriate A' frame pixel output by the Frame A' store is determined from the known location of the D frame pixel and the appropriate subordinate motion vector. Thus, in this case, the subtracter 78 generates the B' frame pixel by weighting and subtracting the co-sited D frame pixel from the appropriate A' frame pixel, the B' frame pixel being supplied to the output 34 via the selector 82.

The decoding apparatus 21 thus serves to generate the frames A' and B' on a pixel by pixel basis on the output 34 in accordance with the system of FIG. 7. As previously demonstrated with reference to FIG. 7, in this particular preferred embodiment, the decoded frames A' and B' constitute perfect reconstructions of the original input frames A, B.

While an embodiment of the invention has been described above with reference to a simple process comprising a single temporal decimation stage, producing one low and one high frequency temporal sub-band, and a single reconstruction stage, it will of course be appreciated that the invention can be applied in a multistage process, for example the wavelet encoding process illustrated with reference to FIG. 4 for frequency separation of an input image sequence into multiple sub-bands of non-uniform size. In this case, each decimation step shown in FIG. 4 is performed by coding apparatus 20 as shown in FIG. 9 so that the vector data is recalculated for the frame pairs coded at each stage of encoding process. The reconstruction process is performed by reversing the encoding process, the sub-band components being supplied in pairs to decoding apparatus 21 as shown in FIG. 10, with the corresponding vector data, at each stage of the reconstruction process until the original input frame sequence is obtained. The method has been confirmed using an eight-frame source sequence, though frame sequences of other lengths may be used provided they are based on an integer power of 2.

As described above, the vector driven temporal decimation process is symmetric in time, entirely separable from any spatial coding process which may be performed, and provides a substantial improvement in picture quality over temporal filtering parallel to the time axis. The sub-band frequency components generated by temporal decimation processes embodying the invention may be subjected to a quantization process, a corresponding de-quantization process being performed at the reconstruction stage. In particular, in a wavelet encoding process such as that illustrated in FIG. 4, different quantization parameters may be applied to each sub-band in accordance with the viewers sensitivity to artifacts caused by each band's quantization errors. Further, after the temporal compression process (i.e. sub-band separation and quantization, etc.), a spatial coding process may be performed on the temporally coded frames if desired. A complementary spatial decoding process is then performed prior to the temporal decoding process on reconstruction.

It will of course be appreciated that many modifications may be made to the specific embodiments described above. By way of example, rather than applying a weighting factor of 4x (here 2) to certain frame D pixels in the decoding process, as performed by the multiplier 70 in FIG. 10, it would be possible to cancel the divide-by-two operation performed by the coding apparatus 20 of FIG. 9 for these pixels. That is to say, in producing D frame pixels co-sited with B frame pixels at locations associated with subordinator vectors, a weighting factor of 2x (i.e. 1 in the above example) could be used. In the decoder 21, the weighting factor could then be 2x (i.e. 1 in the above example) for all pixels used in producing pixels of the decoded frames.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Video signal coding apparatus for coding first and second input video images, the apparatus comprising:

a motion vector generator for matching pixels of the second input image with pixels of the first input image to derive motion vectors representing the motion of pixels in the second image between the two images, each motion vector being associated with the location of a pixel in the second image and the location of the matched pixel in the first image;

an encoder for processing the two input images to produce first and second output video images, pixels of the first output image being produced by addition of equally weighted pixels in the two input images, and pixels of the second output image being produced by subtraction of equally weighted pixels in the two input images;

a coding controller for controlling the encoder in dependence upon the motion vectors such that said pixels of the first output image is produced by addition of the co-sited pixel in the first input image and its matched pixel in the second input image as determined by the associated motion vector, and each said pixel of the second output image is produced by subtracting the co-sited pixel in the second input image from its matched pixel in the first input image as determined by the associated motion vector; and means for identifying any pixel locations in the first input image which are associated with more than one motion vector, selecting, for each such pixel location, one of the associated motion vectors as a dominant vector for that pixel location, and flagging as a subordinate vector each remaining vector associated with that pixel location, wherein the coding controller is arranged to control the encoder such that, where more than one vector is associated with a pixel location in the first input image, the co-sited pixel in the first output image is produced by addition of pixels associated with the dominant vector.

2. Apparatus as claimed in claim 1, wherein said means for selecting dominant vectors is arranged to select, for each said pixel location which is associated with more than one vector, a vector with the lowest magnitude as the dominant vector for that pixel location.

3. Apparatus as claimed in claim 1, further comprising video signal decoding apparatus for producing first and second decoded video images corresponding to the coded first and second input video images, the video signal decoding apparatus comprising:

a decoder for receiving the first and second output video images produced by the coding apparatus, for producing pixels of the first decoded image, corresponding to the first input video image, by addition of equally weighted pixels in the two output images, and for producing pixels of the second decoded image, corresponding to the second input video image, by subtraction of equally weighted pixels in the two output images; and a decoding controller, arranged for receiving the motion vectors associated with the locations of matched pixels in the two input images, the decoding controller being arranged to control the decoder such that each said pixel of the first decoded image is produced by addition of the co-sited pixel in the first output image and the pixel in the second output image at the matched pixel location for the pixel in the first input image corresponding to the pixel to be produced as determined by the associated motion vector, and each said pixel of the second decoded image is produced by subtracting the co-sited pixel in the second output image from the pixel in the first output image at the matched pixel location for the pixel in the second input image corresponding to the pixel to be produced as determined by the associated motion vector.

4. Apparatus as claimed in claim 1, including means for identifying the locations of any unmatched pixels in the first input image, wherein the coding controller is arranged to control the encoder such that a pixel of the first output image co-sited with an unmatched pixel in the first input image is produced directly from the unmatched pixel.

5. Apparatus as claimed in claim 4, further comprising video signal decoding apparatus for producing decoded video images corresponding to the coded input video images, the video signal decoding apparatus comprising:

a decoder for receiving the first and second output video images produced by the coding apparatus, for producing pixels of the first decoded image, corresponding to the first input video image, by addition of equally weighted pixels in the two output images, and for producing pixels of the second decoded image, corresponding to the second input video image, by subtraction of equally weighted pixels in the two output images; and a decoding controller, arranged for receiving the motion vectors associated with the locations of matched pixels in the two input images, the decoding controller being arranged to control the decoder such that each said pixel of the first decoded image is produced by addition of the co-sited pixel in the first output image and the pixel in the second output image at the matched pixel location for the pixel in the first input image corresponding to the pixel to be produced as determined by the associated motion vector, and each said pixel of the second decoded image is produced by subtracting the co-sited pixel in the second output image from the pixel in the first output image at the matched pixel location for the pixel in the second input image corresponding to the pixel to be produced as determined by the associated motion vector, and wherein the decoding controller is arranged to control the decoder such that pixels of the first decoded image corresponding to unmatched pixels of the first input image are produced directly from the co-sited pixels in the first output image.

6. Apparatus as claimed in claim 1, further comprising video signal decoding apparatus for producing decoded video images corresponding to the coded input video images, the video signal decoding apparatus comprising:

a decoder for receiving the first and second output video images produced by the coding apparatus, for producing pixels of the first decoded image, corresponding to the first input video image, by addition of equally weighted pixels in the two output images, and for producing pixels of the second decoded image, corresponding to the second input video image, by subtraction of equally weighted pixels in the two output images; and a decoding controller, arranged for receiving the motion vectors associated with the locations of matched pixels in the two input images, the decoding controller being arranged to control the decoder such that each said pixel of the first decoded image is produced by addition of the co-sited pixel in the first output image and the pixel in the second output image at the matched pixel location for the pixel in the first input image corresponding to the pixel to be produced as determined by the associated motion vector, and each said pixel of the second decoded image is produced by subtracting the co-sited pixel in the second output image from the pixel in the first output image at the matched pixel location for the pixel in the second input image corresponding to the pixel to be produced as determined by the associated motion vector, and wherein the decoding controller is arranged to control the decoder such that, where more than one vector is associated with a pixel location in the first input image, the corresponding pixel in the first decoded image is produced by addition of output image pixels at locations associated with the dominant vector.

7. Video signal decoding apparatus as claimed in claim 6, wherein the decoder is arranged to produce the first decoded image before the second decoded image, and wherein the decoding controller is arranged to control the decoder such that a pixel in the second decoded image corresponding to a pixel in the second input image at a location associated with a subordinate vector is produced by subtracting the co-sited pixel in the second output image from the pixel in the first decoded image at the matched pixel location for the pixel in the second input image corresponding to the pixel to be produced as determined by the associated motion vector.

8. Video signal processing apparatus comprising coding apparatus for coding first and second input video images, the coding apparatus comprising: a motion vector generator for matching pixels of the second input image with pixels of the first input image to derive motion vectors representing the motion of pixels in the second image between the two images, each motion vector being associated with the location of a pixel in the second image and the location of the matched pixel in the first image; an encoder for processing the two input images to produce first and second output video images, pixels of the first output image being produced by addition of equally weighted pixels in the two input images, and pixels of the second output image being produced by subtraction of equally weighted pixels in the two input images; and a coding controller for controlling the encoder in dependence upon the motion vectors such that each said pixel of the first output image is produced by addition of the co-sited pixel in the first input image and its matched pixel in the second input image as determined by the associated motion vector, and each said pixel of the second output image is produced by subtracting the co-sited pixel in the second input image from its matched pixel in the first input image as determined by the associated motion vector, wherein the coding controller is arranged to control the encoder such that, when producing output image pixels by addition or subtraction of input image pixels the encoder weights the input pixels with a multiplicative weighting factor of x, and in producing all other output image pixels, the encoder weights the input image pixels with a multiplicative weighting factor of 2x; and decoding apparatus for producing first and second decoded video images corresponding to the first and second input video images coded by the coding apparatus, the decoding apparatus comprising: a decoder for receiving the first and second output video images produced by the coding apparatus, for producing pixels of the first decoded image, corresponding to the first input video image, by addition of equally weighted pixels in the two output images, and for producing pixels of the second decoded image, corresponding to the second input video image, by subtraction of equally weighted pixels in the two output images; and a decoding controller, arranged for receiving the motion vectors associated with the locations of matched pixels in the two input images, the decoding controller being arranged to control the decoder such that each said pixel of the first decoded image is produced by addition of the co-sited pixel in the first output image and the pixel in the second output image at the matched pixel location for the pixel in the first input image corresponding to the pixel to be produced as determined by the associated motion vector, and each said pixel of the second decoded image is produced by subtracting the co-sited pixel in the second output image from the pixel in the first output image at the matched pixel location for the pixel in the second input image corresponding to the pixel to be produced as determined by the associated motion vector.

9. Video signal processing apparatus as claimed in claim 8, wherein the coding apparatus includes means for identifying any pixel locations in the first input image which are associated with more than one motion vector, selecting, for each such pixel location, one of the associated motion vectors as a dominant vector for that pixel location, and flagging as a subordinate vector each remaining vector associated with that pixel location, the coding controller being arranged to control the encoder such that, where more than one vector is associated with a pixel location in the first input image, the co-sited pixel in the first output image is produced by addition of pixels associated with the dominant vector, and wherein the decoder is arranged to produce the first decoded image before the second decoded image, and wherein the decoding controller is arranged to control the decoder such that, where more than one vector is associated with a pixel location in the first input image, the corresponding pixel in the first decoded image is produced by addition of output image pixels at locations associated with the dominant vector, and such that a pixel in the second decoded image corresponding to a pixel in the second input image at a location associated with a subordinate vector is produced by subtracting the co-sited pixel in the second output image from the pixel in the first decoded image at the matched pixel location for the pixel in the second input image corresponding to the pixel to be produced as determined by the associated motion vector.

10. Apparatus as claimed in claim 8, wherein x=½.

11. Apparatus as claimed in claim 8, wherein the decoding controller is arranged to control the decoder such that, when producing a pixel of the second decoded image by subtraction of a pixel in the second output image from a pixel in the first decoded image, said pixel in the second output image is first weighted with a multiplicative weighting factor of 4x, all other pixels used in producing pixels of the decoded images being weighted with a multiplicative weighting factor of 2x.

12. Apparatus as claimed in claim 11, wherein x=½.

13. A video signal coding method for coding first and second input video images, the method comprising:

matching pixels of the second input image with pixels of the first input image to derive motion vectors representing the motion of pixels in the second image between the two images, each motion vector being associated with the location of a pixel in the second image and the location of the matched pixel in the first image;

processing the two input images to produce first and second output video images, pixels of the first output image being produced by addition of equally weighted pixels in the two input images, and pixels of the second output image being produced by subtraction of equally weighted pixels in the two input images, wherein each said pixel of the first output image is produced by addition of the co-sited pixel in the first input image and its matched pixel in the second input image as determined by the associated motion vector, and each said pixel of the second output image is produced by subtracting the co-sited pixel in the second input image from its matched pixel in the first input image as determined by the associated motion vector; and identifying any pixel locations in the first input image which are associated with more than one motion vector, selecting, for each such pixel location, one of the associated motion vectors as a dominant vector for that pixel location, and flagging as a subordinate vector each remaining vector associated with that pixel location, wherein, where more than one vector is associated with a pixel location in the first input image, the co-sited pixel in the first output image is produced by addition of pixels associated with the dominant vector.

14. A method as claimed in claim 13, wherein, for each said pixel location which is associated with more than one vector, a vector with the lowest magnitude is selected as the dominant vector for that pixel location.

15. A method as claimed in claim 13, further comprising video signal decoding for producing first and second decoded video images corresponding to the coded first and second input video images, the video signal decoding comprising:

receiving the first and second output video images, and the motion vectors associated with the locations of matched pixels, produced by the coding method;

producing pixels of the first decoded image, corresponding to the first input video image, by addition of equally weighted pixels in the two output images, and producing pixels of the second decoded image, corresponding to the second input video image, by subtraction of equally weighted pixels in the two output images;

wherein each said pixel of the first decoded image is produced by addition of the co-sited pixel in the first output image and the pixel in the second output image at the matched pixel location for the pixel in the first input image corresponding to the pixel to be produced as determined by the associated motion vector, and each said pixel of the second decoded image is produced by subtracting the co-sited pixel in the second output image from the pixel in the first output image at the matched pixel location for the pixel in the second input image corresponding to the pixel to be produced as determined by the associated motion vector.

16. A method as claimed in claim 13, including identifying the locations of any unmatched pixels in the first input image, wherein a pixel of the first output image co-sited with unmatched pixel in the first input image is produced directly from the unmatched pixel.

17. A method as claimed in claim 16, further comprising video signal decoding for producing decoded video images corresponding to the coded first and second input video images, the video signal decoding comprising:

receiving the first and second output video images, and the motion vectors associated with the locations of matched pixels, produced by the coding method;

producing pixels of the first decoded image, corresponding to the first input video image, by addition of equally weighted pixels in the two output images, and producing pixels of the second decoded image, corresponding to the second input video image, by subtraction of equally weighted pixels in the two output images;

wherein each said pixel of the first decoded image is produced by addition of the co-sited pixel in the first output image and the pixel in the second output image at the matched pixel location for the pixel in the first input image corresponding to the pixel to be produced as determined by the associated motion vector, and each said pixel of the second decoded image is produced by subtracting the co-sited pixel in the second output image from the pixel in the first output image at the matched pixel location for the pixel in the second input image corresponding to the pixel to be produced as determined by the associated motion vector, and wherein pixels of the first decoded image corresponding to unmatched pixels of the first input image are produced directly from the co-sited pixels in the first output image.

18. A method as claimed in claim 13, further comprising video signal decoding for producing decoded video images corresponding to the coded first and second input video images, the video signal decoding comprising:

receiving the first and second output video images, and the motion vectors associated with the locations of matched pixels, produced by the coding method;

producing pixels of the first decoded image, corresponding to the first input video image, by addition of equally weighted pixels in the two output images, and producing pixels of the second decoded image, corresponding to the second input video image, by subtraction of equally weighted pixels in the two output images;

wherein each said pixel of the first decoded image is produced by addition of the co-sited pixel in the first output image and the pixel in the second output image at the matched pixel location for the pixel in the first input image corresponding to the pixel to be produced as determined by the associated motion vector, and each said pixel of the second decoded image is produced by subtracting the co-sited pixel in the second output image from the pixel in the first output image at the matched pixel location for the pixel in the second input image corresponding to the pixel to be produced as determined by the associated motion vector, and wherein, where more than one vector is associated with a pixel location in the first input image, the corresponding pixel in the first decoded image is produced by addition of output image pixels at locations associated with the dominant vector.

19. A video signal decoding method as claimed in claim 18, wherein the first decoded image is produced before the second decoded image, and wherein a pixel in the second decoded image corresponding to a pixel in the second input image at a location associated with a subordinate vector is produced by subtracting the co-sited pixel in the second output image from the pixel in the first decoded image at the matched pixel location for the pixel in the second input image corresponding to the pixel to be produced as determined by the associated motion vector.

20. A video signal processing method comprising a coding method for coding first and second input video images, the coding method comprising: matching pixels of the second input image with pixels of the first input image to derive motion vectors representing the motion of pixels in the second image between the two images, each motion vector being associated with the location of a pixel in the second image and the location of the matched pixel in the first image; processing the two input images to produces first and second output video images, pixels of the first output image being produced by addition of equally weighted pixels in the two input images, and pixels of the second output image being produced by subtraction of equally weighted pixels in the two input images; wherein each said pixel of the first output image is produced by addition of the co-sited pixel in the first input image and its matched pixel in the second input image as determined by the associated motion vector, and each said pixel of the second output image is produced by subtracting the co-sited pixel in the second input image from its matched pixel in the first input image as determined by the associated motion vector;

a decoding method for producing first and second decoded video images corresponding to the first and second input video images coded by the method, the decoding method comprising: receiving the first and second output video images, and the motion vectors associated with the locations of matched pixels, produced by the coding method; producing pixels of the first decoded image, corresponding to the first input video image, by addition of equally weighted pixels in the two output images, and producing pixels of the second decoded image, corresponding to the second input video image, by subtraction of equally weighted pixels in the two output images; wherein each said pixel of the first decoded image is produced by addition of the co-sited pixel in the first output image and the pixel in the second output image at the matched pixel location for the pixel in the first input image corresponding to the pixel to be produced as determined by the associated motion vector, and each pixel of the second decoded image is produced by subtracting the co-sited pixel in the second output image from the pixel in the first output image at the matched pixel location for the pixel in the second input image corresponding to the pixel to be produced as determined by the associated motion vector; wherein the coding method includes identifying any pixel locations in the first input image which are associated with more than one motion vector, selecting, for each such pixel location, one of the associated motion vectors as a dominant vector for that pixel location, and flagging as a subordinate vector each remaining associated with that pixel location, wherein, where more than one vector is associated with a pixel location in the first input image, the co-sited pixel in the first output image is produced by addition of pixels associated with the dominant vector, and wherein, where more than one vector is associated with a pixel location in the first input image, the corresponding pixel in the first decoded image is produced by addition of output image pixels at locations associated with the dominant vector, and wherein the first decoded image is produced before the second decoded image, and wherein a pixel in the second decoded image corresponding to a pixel in the second input image at a location associated with a subordinate vector is produced by subtracting the co-sited pixel in the second output image from the pixel in the second input image corresponding to the pixel to be produced as determined by the associated motion vector.

21. A video signal processing method as claimed in claim 20, wherein, when producing pixels of said output images by addition or subtraction of pixels in said input images, the input pixels are weighted with a multiplicative weighting factor of x; and in producing all other pixels of the said output images, the input image pixels are weighted with a multiplicative weighting factor of 2x.

22. A method as claimed in claim 21, wherein x=½.

23. A method as claimed in claim 21 wherein, when producing a pixel in the second decoded image by subtracting a pixel in the second output image from a pixel in the first decoded image, said pixel in the second output image is first weighted with a multiplicative weighting factor of 4x, all other pixels used in producing pixels of the said decoded images being weighted with a multiplicative weighting factor of 2x.

24. A method as claimed in claim 23, wherein x=½.

* * * * *